United States Patent [19]

Smyres et al.

[11] 4,053,305
[45] Oct. 11, 1977

[54] RECOVERY OF COPPER AND SILVER FROM SULFIDE CONCENTRATES

[75] Inventors: Gary A. Smyres, Sparks; Philip R. Haskett, Reno; Bernard J. Scheiner, Sparks; Roald E. Lindstrom, Reno, all of Nev.

[73] Assignee: The United States of America as represented by the Secretary of the Interior, Washington, D.C.

[21] Appl. No.: 732,675

[22] Filed: Oct. 15, 1976

[51] Int. Cl.² .................................... C22B 15/00
[52] U.S. Cl. .................................. 75/104; 75/117; 75/118 R; 75/120; 204/110; 423/38; 423/100
[58] Field of Search ............ 75/104, 101 BE, 118 R, 75/117, 106, 120, 114; 204/110; 423/38, 100

[56] References Cited

U.S. PATENT DOCUMENTS

| 814,836 | 3/1906 | Elliott ..................................... 75/104 |
| 937,293 | 10/1909 | Elliott et al. ............................ 75/104 |
| 981,451 | 1/1911 | McKechmie et al. ............. 75/104 X |
| 1,251,302 | 12/1917 | Tainton ................................. 204/110 |
| 3,973,949 | 8/1976 | Goens et al. ......................... 75/114 X |

*Primary Examiner*—G. Ozaki
*Attorney, Agent, or Firm*—William S. Brown; Donald A. Gardiner

[57] ABSTRACT

Copper and silver are recovered from complex sulfide ores or concentrates containing, in addition, metals such as lead, zinc, arsenic, antimony, and iron by leaching with a combination of ferrous chloride and oxygen.

1 Claim, 1 Drawing Figure

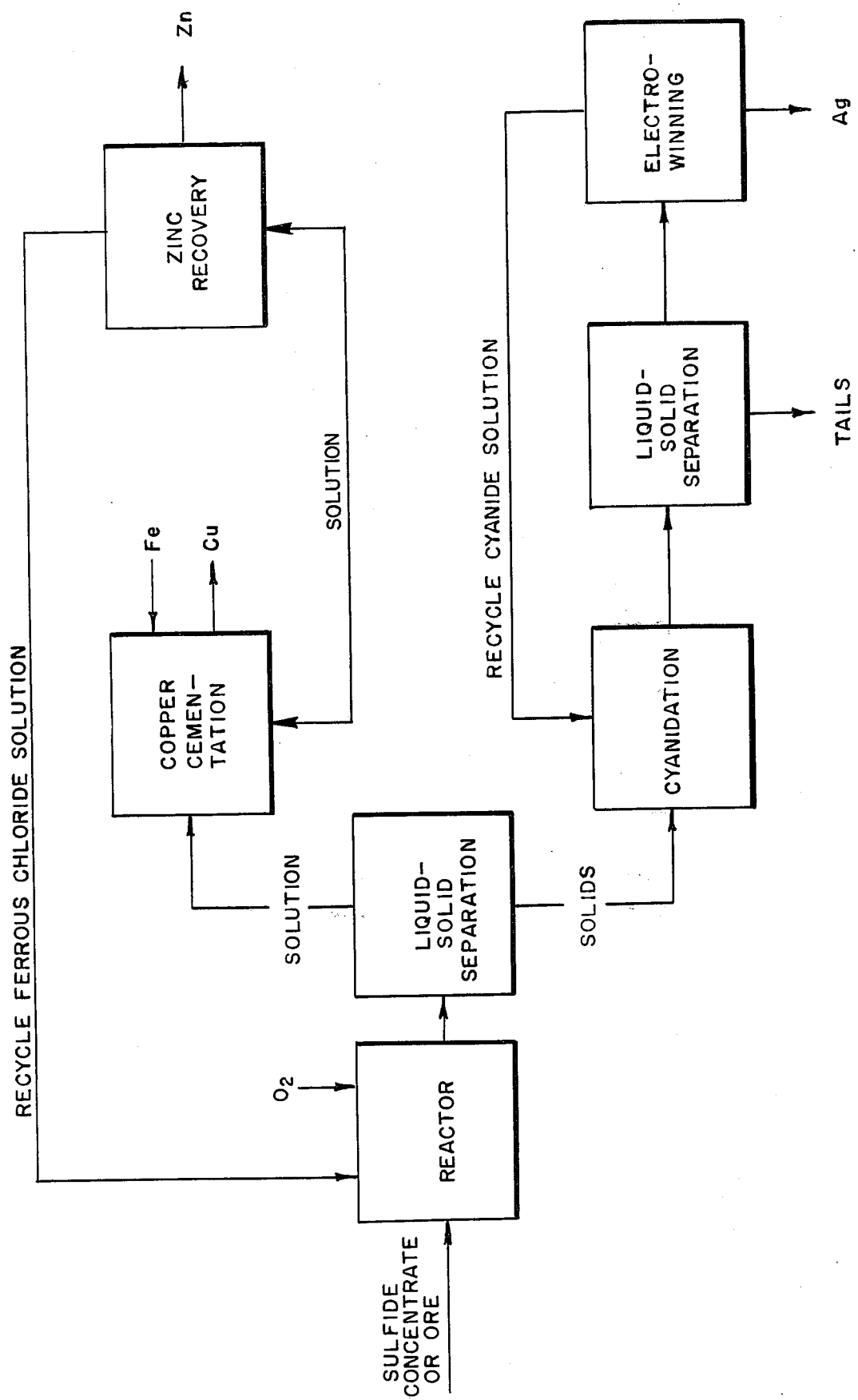

RECOVERY OF COPPER AND SILVER FROM SULFIDE CONCENTRATES

Recovery of desirable metal values from complex sulfide concentrates has conventionally been accomplished by means of roasting and smelting operations. However, such operations have become increasingly costly, as well as presenting severe pollution problems. These problems have stimulated considerable interest in development of hydrometallurgical procedures for recovery of metal values from sulfide concentrates.

Chlorination and acid-oxygen leaching procedures have been investigated for the recovery of metal values from sulfide concentrates. Favorable metal recovery values are obtained with the chlorination technique. However, the system results in the dissolution of metals such as iron and arsenic and complex schemes are required to separate and remove these metals. The acid-oxygen leaching technique is more selective but high metal extraction is not common. Also, some of the iron is extracted into solution and additional processing steps are required to remove it.

More recently, a ferric chloride leaching technique was developed for treating chalcopyrite and galena concentrates (see U.S. Bureau of Mines Report of Investigations 8007, 1975). In this system the metal sulfide is oxidized by ferric chloride to produce metal chloride and elemental sulfur. The system successfully treats classical concentrates such as chalcopyrite and galena, but as the concentrates become more complex in mineral composition the ferric chloide system has several disadvantages. If a galena concentrate containing copper and silver is treated, the copper and silver are co-extracted and must be separated. The simplest separation uses copper powder to precipitate the silver. However, a silver product containing large amounts of copper is produced and a costly fire refining procedure must be used to produce high-grade silver bullion. Also, to recover the copper and to regenerate the ferric chloride solution for recycle, a diaphragm cell and turbo aerator sequence is required. For a small operator the capital cost would be high, and for a small operation the operating cost per pound of metal produced would be excessive.

It has now been found, in accordance with the present invention, that copper and silver can be effectively recovered from complex sulfide ores or concentrates by leaching the ores or concentrates with a combination of ferrous chloride and oxygen, i.e., by means of a ferrous chloride-oxygen leach. This procedure permits an efficient recovery of copper and silver from the ore or concentrate without dissolution of contaminants such as arsenic, antimony, and iron, thus eliminating the need for further separation procedures for these undesired metals.

In addition, the process of the invention results in an effective separation of copper and silver, and sulfide contained in the concentrate is converted to elemental sulfur. The process also operates at relatively low temperature and pressure, and the leaching process is exothermic thus minimizing the need for external heating.

A flow sheet of the overall process of the invention is shown in the FIGURE.

Feed materials for use in the process of the invention may comprise ores, or concentrates from treatment of ores by conventional means such as leaching, flotation, etc. Typically, the feed will contain about 1 to 25 percent copper, 1 to 10 percent lead, 1 to 10 percent zinc, 0.1 to 4 percent antimony, 0.1 to 2 percent arsenic, 0.1 to 40 percent iron, 1 to 2000 oz/ton silver, 5 to 30 percent sulfide, and 1 to 25 percent sulfate.

The ore or concentrate is initially ground to a suitable particle size, generally about minus 80 mesh, and is then slurried with ferrous chloride solution to give a pulp density of up to about 60 percent. Optimum pulp density will vary with the grade of the ore or the nature of the concentrate. Optimum concentration of the ferrous chloride solution will also vary with the specific ore or concentrate, but generally a concentration of about 20 to 400 g/l is satisfactory.

After slurrying, the materials are placed in a closed reactor and oxygen is added at a controlled rate to cause the temperature to rise to the desired value, usually from about 100° to 115° C, although reaction temperatures of about 90° to 150° C may be satisfactory in specific applications. Pressure in the reactor is maintained at about 20 to 80 psig, preferably about 50 psig.

After the system stops consuming oxygen, generally a period of about 1 to 6 hours, the reaction mixture is cooled to room temperature, filtered, and the residue washed with water. Copper and zinc are solubilized during the leaching reaction, with lead, arsenic, antimony, iron, and silver remaining in the filter residue.

Copper is most conveniently recovered from the filtrate by cementation with iron, e.g., by addition of shredded iron cans, the resulting ferrous chloride solution, after removal of zinc, being recycled to the reactor for admixture with a new charge of ore or concentrate. Recovery of zinc from the ferrous chloride solution is most conveniently accomplished by solvent extraction as, for example, with a tertiary amine.

The residue from the reactor is slurried with a solution of about 1.0 to 5.0 percent sodium cyanide and about 0.2 to 1.0 percent sodium hydroxide, or other base such as lime, to solubilize the silver. The slurry is filtered and washed and the filtrate electrolyzed to recover metallic silver, after which the electrolyte solution may be recycled to the cyanidation step. The residue contains elemental sulfur, iron as a mixture of insoluble iron oxides, antimony as an insoluble oxide, arsenic as an insoluble iron arsenate, and lead as insoluble lead sulfate.

The invention will be more specifically illustrated by the following examples:

EXAMPLE 1

Concentrate (50 g), water (100 ml), and $FeCl_2 \cdot 4H_2O$ (43.5 g) were slurried together and placed in a laboratory sized closed reactor. Oxygen was added over a 4 hour period. The temperature was maintained between 100° and 115° C. The slurry was filtered and washed. The residue was cyanided for 24 hours and filtered. The filtrate was placed in an electrolysis cell and the silver recovered as the metal. Copper was recovered from the reaction filtrate by cementation with powdered iron. The results are summarized in Table 1.

Table 1

| | Cu | Pb | Sb | Fe | Zn | As | Ag |
|---|---|---|---|---|---|---|---|
| Head analysis, pct | 25.0 | 1.5 | 0.36 | 16.0 | 1.3 | 0.54 | 1266.6 oz/ton |
| Extraction, pct. | 96.4 | <.1 | <.1 | <.1 | 99 | <.1 | 98.1 |

EXAMPLE 2

Concentrate (4,000 g), water (6,000 ml), and 3,840 g of $FeCl_2 \cdot 4H_2O$ were slurried together in a 10 liter capacity closed reactor. Oxygen was added over a 4 hour period and the temperature was maintained between 100° and 145° C. After oxidation, the slurry was treated in the same manner as described in example 1. The results are shown in Table 2.

Table 2

|  | Cu | Pb | Sb | Fe | Zn | As | Ag |
|---|---|---|---|---|---|---|---|
| Extraction, pct | 98.2 | <0.1 | <0.1 | <0.1 | 99 | <0.1 | 99.8 |

EXAMPLE 3

This example and Example 4, below, illustrate the superiority of the ferrous chloride-oxygen leach of the invention over that of a ferric chloride leach of the type discussed above (Bureau of Mines Report of Investigations 8007).

In Example 1, above 43.5 g of $FeCl_2 \cdot 4H_2O$ was used to treat 50 g of concentrate. This amounts to 12.2 g of iron as ferrous ion. A comparable test with the ferric chloride leaching system was conducted by reacting 50 g of the same concentrate with 59.2 g of $FeCl_3 \cdot 6H_2O$ (12.2 g iron) at 100° C for 4 hours. The reaction slurry was filtered to remove the copper-bearing solution and the resulting residue cyanided. The results of these tests are shown in Table 3.

Table 3

|  | Extraction, pct | |
|---|---|---|
|  | Cu | Ag |
| $FeCl_3 \cdot 6H_2O$ | 45.6 | 1 |
| $FeCl_2$—$O_2$ | 96.4 | 98.1 |

The data show that the ferric chloride leaching system extracted about half the copper, with silver extraction being nil.

EXAMPLE 4

This example illustrates the results obtained with the prior art ferric chloride leach when a large excess of ferric chloride is employed.

To a slurry containing 350 ml $H_2O$ and 50 g of the concentrate of the above examples, 150 g of $FeCl_3 \cdot 6H_2O$ was added. This amounts to 30.96 g of ferric ion or an excess of 250 pct when compared to the amount of ferrous ion used in the ferrous chloride-oxygen system of the invention. The reaction conditions were 100° C for 4 hours. When the reaction was complete, the slurry was cooled and filtered to recover the dissolved copper and the resulting residue was cyanided to extract the silver. Data from this test are shown in Table 4, along with data obtained previously from the ferrous chloride-oxygen leach.

Table 4

|  | Extraction, pct | |
|---|---|---|
| System | Cu | Ag |
| $FeCl_3 \cdot 6H_2O$ | 96 | 83.8 |
| $FeCl_2$—$O_2$ | 96.4 | 98.1 |

The distribution of silver and iron in the copper filtrate solutions from the two leach systems is shown in Table 5.

Table 5

|  | Element, g/l | |
|---|---|---|
| System | Ag | Fe |
| $FeCl_3 \cdot 6H_2O$ | 0.39 | 90 |
| $FeCl_2$—$_2$ | 0.02 | <0.1 |

From the above data, it is apparent that a large excess of ferric chloride is necessary to achieve results, in terms of extraction of copper and silver, that are comparable to those achieved with the ferrous chloride-oxygen leach of the invention. In addition, the ferric chloride leach results in extraction of substantial amounts of silver and iron into the copper filtrate solution, thus necessitating a difficult removal of silver and iron from the copper solution.

We claim:

1. A process for recovering copper and silver from complex sulfide ores or concentrates containing copper, zinc, silver, lead, arsenic, antimony and iron comprising (1) treating a slurry of the ore or concentrate in an aqueous solution of ferrous chloride with gaseous oxygen at a temperature of about 100° to 115° C and a pressure of about 20 to 80 psig for a time sufficient to solubilize copper and zinc, (2) filtering the resulting reaction mixture, (3) precipitating copper from the filtrate by addition of metallic iron, (4) treating the resulting copper-free filtrate for removal of zinc by solvent extraction and recycling the resulting ferrous chloride solution to step (1), (5) treating the residue from step (2) with an alkaline solution to sodium cyanide to solubilize the silver and, (6) electrolyzing the silver solution from step (5) to recover metallic silver.

* * * * *